(12) United States Patent
Rose

(10) Patent No.: US 7,656,108 B2
(45) Date of Patent: Feb. 2, 2010

(54) LINEAR MOTOR AND TRANSDUCER ARRANGEMENT THEREFOR

(75) Inventor: Ian David Rose, Benfleet (GB)

(73) Assignee: Copley Motion Systems LLC (GB)

(*) Notice: Subject to any disclaimer, the term of this patent is extended or adjusted under 35 U.S.C. 154(b) by 190 days.

(21) Appl. No.: 10/587,409

(22) PCT Filed: Jan. 26, 2005

(86) PCT No.: PCT/GB2005/000254
§ 371 (c)(1),
(2), (4) Date: Jun. 25, 2008

(87) PCT Pub. No.: WO2005/071816
PCT Pub. Date: Aug. 4, 2005

(65) Prior Publication Data
US 2008/0265807 A1 Oct. 30, 2008

(30) Foreign Application Priority Data
Jan. 27, 2004 (GB) ................. 0401748.9

(51) Int. Cl.
*H02K 41/00* (2006.01)
(52) U.S. Cl. ............... 318/135; 318/434; 318/490
(58) Field of Classification Search ........... 318/135, 318/434, 490, 400.38; 310/12, 13, 14; 324/165
See application file for complete search history.

(56) References Cited

U.S. PATENT DOCUMENTS

| 4,757,244 A | 7/1988 | Iwamoto et al. |
| 6,316,848 B1 | 11/2001 | Rohner et al. |
| 2005/0258820 A1* | 11/2005 | Forster ............ 324/165 |

FOREIGN PATENT DOCUMENTS

| DE | 19842719 | 3/2000 |
| EP | 0 455 983 A1 | 11/1991 |
| EP | 0 652 419 A1 | 5/1995 |
| EP | 0 704 678 | 4/1996 |
| EP | 0 599 175 | 2/1998 |
| EP | 1014539 A | 6/2000 |
| GB | 2079068 A | 1/1982 |
| GB | 2235783 A | 3/1991 |

* cited by examiner

*Primary Examiner*—Karen Masih
(74) *Attorney, Agent, or Firm*—Harness, Dickey & Pierce, P.L.C.

(57) ABSTRACT

An improved linear motor which compensates for manufacturing or assembly errors in the positioning of the magnetic field detectors. The linear motor synthesizes a correction signal which can be simply combined (for example added) to the output of one of the magnetic field detectors so as to ensure that the magnetic field detector outputs have the correct phase relationship. This in turn ensures that accurate positioning of the rotor relative to the stator can be achieved. In a preferred embodiment, a deliberate error is introduced into the positioning of the magnetic field detectors and this error, plus any error due to manufacturing or assembly tolerances, is corrected using the correction signal. This allows a simplified correction circuit which only corrects for phase offset errors in one direction to be used.

38 Claims, 6 Drawing Sheets

Fig.1.
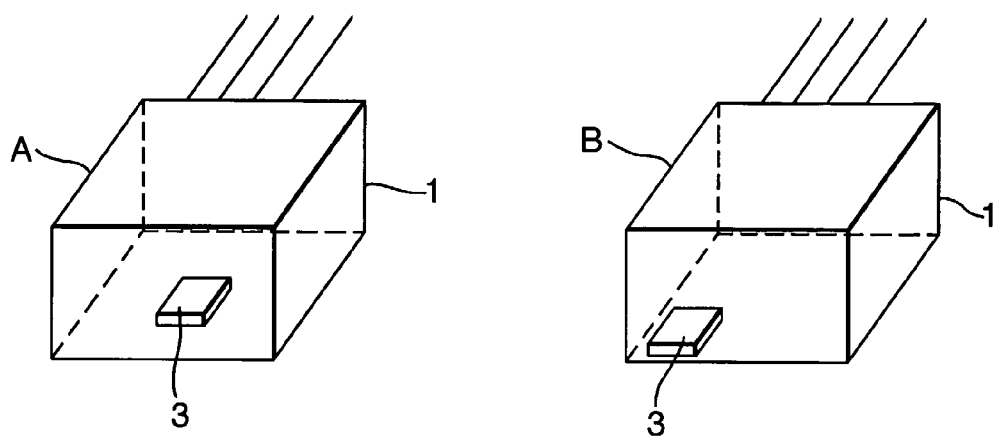
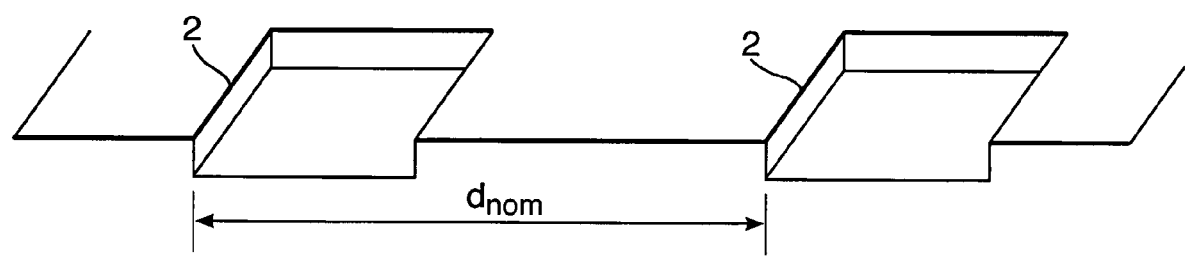

LINEAR MOTOR AND TRANSDUCER ARRANGEMENT THEREFOR

The present invention relates to a linear motor, a method of making a linear motor and a method of operating a linear motor. The invention concerns in particular improved means and methods for overcoming some problems associated with manufacturing or assembly tolerances, particularly of the magnetic field detectors used in commutation.

GB 2,079,068-A discloses a basic linear motor to which the present invention may be applied. The disclosure of this document is hereby incorporated by reference.

Linear electric motors are now in widespread use in industrial applications requiring the rapid and accurate positioning of one component relative to another. An example of such an application is, for example, the rapid and precise positioning of a test probe over a printed circuit board to check the circuit pathways thereof, prior to loading it with expensive integrated circuits. A further example is one in which very smooth motion is required, with imperceptible variation in velocity of the component being moved. In either case, the achievement of tight and precise servo control is essential over the motion of the motor's rotor relative to its stator. Further, a high resolution of detected movement is desirable for achieving precise control.

For the purpose of commutating the coils of permanent magnet linear motors, and in some cases the positioning of the rotors thereof relative to their stators, it is well known to use one or more magnetic field detectors, such as Hall effect sensors. The sensors provide controlling signals to electrical circuits powering the coils of the motors, as well as to software used for the servo positioning of the rotor of the motor. The sensors may be mounted, for example, on the stator of the motor, and as this is traversed by the rotor, so cyclical signals are provided indicating the position of the rotor relative to its stator. The signals vary in accordance with the strength of the repeating sequence of magnetic fields emanating from the rotor. In many cases, the signal provided by the sensors approximates to a sinusoid, reflecting the sinusoidal variation in magnetic field strength along the length of the rotor. An example of the use of such sensors is described in granted UK patent no. 2,235,783, the disclosure of which is hereby incorporated by reference. Please note GB 2,079,068 and GB 2,235,783 refer to the central rod as the "stator" and the outer tube as the "armature". In this application, the central rod containing the permanent magnets is referred to as the "rotor" with the outer tube housing the coils being called the "stator", consistent with EP 1,014,539.

The present invention is particularly applicable to the arrangement shown in FIG. 5 of GB 2,235,783. In this arrangement, two Hall effect sensors 10 are mounted on the stator and are longitudinally separated by a distance corresponding to one quarter of the full cyclical pole pitch of the magnets of the rotor 1. As the rotor 1 moves relative to the stator 2, sinusoidal signals are measured at the Hall effect sensors 10. These are shown in FIG. 6a of GB 2,235,783. The longitudinal spacing of the Hall effect sensors ensures that one signal is sinusoidal and the other signal is co-sinusoidal, i.e. the signals are 90° out of phase with respect to each other.

A particular problem occurs in ensuring that the Hall effect sensors are properly longitudinally spaced apart so as to ensure that the obtained signals are exactly 90° out of phase. Any error in the spacing of the sensors will translate into a phase offset error in the obtained signals.

The Hall effect sensors are typically pre-packaged in a housing 1, as shown in FIG. 1. While it is possible to mount the housing 1 of the sensors A, B hard up against datum recesses 2 in the stator to ensure an accurate spacing of the housings 1 by a predetermined nominal distance $d_{nom}$, this does not of itself ensure that the signals obtained have the necessary phase relationship. A problem occurs in that the actual sensing probe head 3 of the Hall effect sensors is positioned at an uncertain location within the housing 1. It can be seen in FIG. 1 that the first Hall effect sensor A has its probe head 3 positioned further to the right and further back than the second Hall effect sensor B. Thus, even when the housing 1 of the Hall effect sensors is mounted on the stator accurately to a high tolerance, errors occur due to the inaccurate mounting of the probe head 3 within the housing 1.

The manufacturers of the Hall effect sensors usually give a tolerance in the positioning of the probe head 3 within the housing 1. For example a typical tolerance for the position of the probe head 3 within the housing 1 is a certain position +/−0.2 mm in any direction. Thus, when two Hall effect sensors A, B from this manufacturer are used the longitudinal spacing of the actual probe heads from one another as shown in FIG. 1 will be $d_{nom}$+/−0.4 mm.

For a typically sized linear motor, the spacing $d_{nom}$ is 12.8 mm and thus the distance between the probe heads 3 of the two Hall effects sensors can range from 12.4 mm to 13.2 mm, even when the housings 1 of the sensors are mounted absolutely precisely. This tolerance in the position of the probe head 3 equates to a potential phase offset error of 3° in either direction. Thus, the signal from the first Hall effect sensor A has a phase shift in the range of from 87 to 93° relative to the signal obtained from the second Hall effect sensor B. This problem is most serious when the Hall effect sensors are used to detect the position of the rotor relative to the stator. A 3° phase offset error in the signals from the Hall effect sensors corresponds to a +/−210 µm error in position measurement in the above example.

It would therefore be desirable to devise an improved linear motor which alleviates to some extent the problem of the uncertain positioning of the probe head 3 within the housing 1 of the hall effect sensors A, B.

EP 1,014,539 A2 addresses this problem and FIG. 7 of that document is similar to FIG. 1 of the present application. The solution suggested by EP 1,014,539 is to include in the linear motor a memory unit (470) in which the manufacturing tolerance in the position of probe head 3 within housing 1 is stored (see claims 6 and 7 of EP 1,014,539 A2). Although storing the tolerances in this manner will allow the user to take these tolerances into account when calculating the accuracy of the linear motor, the use of a memory means in this way does not itself overcome the problem because the motor output remains inaccurate due to the tolerances. EP 1,014,539 gives no teaching of how the problem of manufacturing tolerances is overcome in practice so as to obtain accurate signals.

The present invention addresses the above discussed problems and provides in a first aspect a linear motor comprising a first magnetic field detector and a second magnetic field detector mutually separated by a nominal predetermined distance that is subject to manufacturing/assembly tolerances that can introduce an error, said error causing said first and second magnetic field detectors to be in reality mutually separated by an actual distance that can be different to said nominal predetermined distance, wherein there exists an ideal working distance by which said first and second magnetic field detectors should be mutually separated in order to obtain ideal signals and further comprising correction means arranged to synthesise a correction signal for correcting the output signal of said first magnetic field detector so that the signals obtained after correction more closely correspond to the signals that would have been obtained had said first and second magnetic field detectors been correctly mutually separated by the ideal working distance.

The use of a correction means that is arranged to synthesise a correction signal ensures that the signal from the first magnetic field detector, although potentially having the wrong phase relationship with the signal from the second magnetic field detector, is corrected so as to have a more correct phase relationship. The correction means is set-up at the time of manufacture of the linear motor to account for any variation in the positioning of the probe head 3 within the housing 1 of the magnetic field detectors A, B.

Preferably the magnetic field detectors are constituted by Hall effect sensors.

The correction means is preferably incorporated into the structure of the linear motor so that the output signals presented to the user are already corrected. This means it is unnecessary for the user to attach extra apparatus to correct the signals from the Hall effect sensors. According to this preferred embodiment, the user is assured that the signals taken from the output terminals of the linear motor are of a high quality with respect to phase shift between the two Hall effect sensor outputs.

The correction signal synthesised by the correction means is preferably one that can be added to the output of the first Hall effect sensor so as to correct it. The phase error in one of the Hall effect sensor signals is typically of the order of up to 3° and so it will be appreciated that only a small correction signal is necessary. The correction signal may be conveniently formulated from a scaled version of the output signal of the second Hall effect sensor. Alternatively, the correction signal can be synthesised from a scaled and phase shifted version of the output signal of the first Hall effect sensor. As a third possibility, the correction signal can be synthesised electronically, either using analogue or digital electronics.

The amplitude of the correction signal (determined by the scaling applied to it in the case when the signal is derived from either of the Hall effect signals) is determined by the degree of correction that is necessary. This in turn is determined by the actual distance that separates the probe head 3 of the Hall effect sensors. This distance can be measured during the manufacturing process and the correction means updated at that time to ensure that an effective correction signal is synthesised during use of the linear motor.

A particularly convenient arrangement is when the correction means comprises a summing circuit with the output of the second Hall effect sensor being scaled in accordance with the value of a resistor in this summing circuit. Variable scaling can be obtained by selecting this resistor to be an adjustable potentiometer. This allows the same components to be used in every linear motor manufactured so that any variation of probe head 3 within the stated tolerance can be accounted for by adjusting the potentiometer at the time of calibration. Thereafter, an appropriate correction signal is always obtained to ensure that the user is supplied with properly phase-shifted signals.

In order to assist in the initial calibration of the linear motor, the adjustable potentiometer is preferably directly digitally controllable by a calibration computer. This allows the calibration computer to select the resistance used in the summing circuit in accordance with measurements automatically read out from the Hall effect sensors. This allows a highly automated calibration procedure to be carried out avoiding laborious and/or tedious manual calibration.

The tolerance in the position of the probe head 3 within the housing 1 of the Hall effect sensors means that the probe heads can be either too far apart or too close together. When the probe heads are too far apart, the phase shift between the output signals is larger than desired and this can be corrected by adding a scaled version of one signal to the other signal. However, in the case where the probe heads 3 are too close together, the phase shift obtained is less than the desired phase shift and a correction cannot be obtained by simple addition. A correction can instead be obtained by subtracting a scaled version of one signal from the other but this requires the use of a subtraction circuit, which is different to, and more complicated than, an addition circuit. Two circuits are thus generally required to account for the fact that the correction signal may need to be positive or negative.

Thus, a second aspect of the present invention provides a linear motor comprising a first magnetic field detector and a second magnetic field detector mutually separated by a nominal predetermined distance that is subject to manufacturing/assembly tolerances that can introduce an error, said error causing said first and second magnetic field detectors to be in reality mutually separated by an actual distance that can be different to said nominal predetermined distance, wherein there exists an ideal working distance by which said first and second magnetic field detectors should be mutually separated in order to obtain ideal signals and wherein said nominal predetermined distance is different to said ideal working distance.

Providing that the nominal predetermined distance is different to the ideal working distance allows only a single addition or subtraction circuit to be used, making the apparatus less complex.

The nominal predetermined distance is preferably greater than the ideal working distance, preferably by an amount such that the actual distance will, for the known tolerances, be greater than the ideal working distance. Separating the Hall effect sensors (magnetic field detectors) by more than is ideal ensures that the Hall effect sensors will always be too far apart and thus ensures that the signals can always be corrected using only an adding circuit. Conversely, selecting the nominal predetermined distance to be shorter than the ideal, so that the Hall effect sensors are always too close meaning that only a single subtracting circuit is needed comes within the present invention. In both cases, there is no need for both an adding circuit and a subtracting circuit in the same linear motor. This reduces the complexity of the correction means, allowing the linear motor to be sold at a more competitive price.

In a preferred embodiment, the ideal working distance gives a phase shift of 90° between the outputs of the first and second Hall effects sensors and the nominal predetermined distance is set such that about 95° of nominal phase shift between the first and second Hall effect sensors is obtained. The tolerance in the positioning of the probe heads 3 within the housing 1 of the Hall effect sensors A, B means that an actual amount of phase shift in the range of 92 to 98° will be obtained. This amount is correctable using a single adding circuit.

Although the present application is exemplified by a linear motor comprising only two Hall effect sensors, the principles of the invention are applicable when more than two sensors are used, but are offset by a predetermined longitudinal distance. For example, the present invention is applicable to any of the linear motors disclosed in WO 03/028194. In FIG. 4 of that document, detector sets 22 and 23 are intended to be longitudinally separated by a 180° phase shift. If tolerances in the manufacturing of the sensors cause the actual phase shift to be different, the present invention can be used to correct the phase shift back to 180°. Similarly, the present invention can be used to ensure that the signal obtained from sets 24 and 25 is almost exactly 90° out of phase with the signals obtained from sets 22 and 23.

Another aspect of the present invention comprises a method of making a linear motor, said method comprising:
- (a) assembling first and second magnetic field detectors on a stator member so as to be a nominal predetermined distance apart;
- (b) analysing the signals from said magnetic field detectors so as to determine a correction signal; and
- (c) adjusting correction means to provide that, in use, said correction signal is synthesised and used to correct the output of said first magnetic field detector so that the signals after correction more closely correspond to ideal signals.

In accordance with this method, the correction means is adjusted at the time of manufacture to ensure that an appropriate correction signal is used to correct the output of the first magnetic field detector during use of the linear motor. As described above, the step of adjusting the correction means can be carried out by adjusting the value of a resistor in a summing circuit.

The correction signal is preferably determined by estimating or measuring the actual phase difference between the outputs of the two magnetic field detector. The actual phase difference can be used to determine a scaling amount that is used for scaling an output of the second magnetic field detector. The scaled output of the second magnetic field detector can then be used as the correction signal, which is added in use to the output of the first magnetic field detector. In order to estimate the phase difference between the signals of the two magnetic field detector the following method can be applied:
- (i) determining a rotor position for which the signal from said second magnetic field detector is substantially zero; then
- (ii) moving the rotor relative to the stator by an amount substantially equal to one quarter of the full cyclical pole pitch of the magnets of the rotor, and
- (iii) measuring the signal from said first magnetic field detector.

If the two magnetic field detectors are perfectly aligned then the signal from the first Hall effect sensor measured in step (iii) will be zero. The sign of the signal measured in step (iii) indicates whether the magnetic field detector are too close or too far apart. In the case where the nominal predetermined distance is larger than the ideal working distance, one would always expect the sign of the signal in step (iii) to be the same. The magnitude of the signal measured in step (iii) indicates the amount of scaling required in order to create the correction signal. If the magnitude of the signal measured in step 3 is small, only a small correction signal will be required and vice versa.

Preferably, a negative feedback loop is used whereby step (iii) is repeated after adjusting the correction means and it is determined whether further adjustment is needed. The correction means can be continuously adjusted until it is determined that the signal from the first magnetic field detector is zero. This indicates that the signals are substantially ideal (i.e. have a mutual phase shift of 90°).

The adjustment procedure can be carried out by a computer that receives the signal measured in step (iii) as an input and outputs a potentiometer setting to a digitally adjustable potentiometer located in a summing circuit of the correction means.

Another aspect of the invention provides a method of making a linear motor, said method comprising:

- (a) determining an ideal working distance by which first and second magnetic field detectors should be mutually separated in order to obtain ideal signals;
- (b) selecting a nominal predetermined distance different to said ideal working distance; and
- (c) assembling first and second magnetic field detectors on a stator member so as to be said nominal predetermined distance apart.

In accordance with this method, only a single addition or subtraction circuit is required.

A further aspect of the invention provides a method of operating a linear motor, said method comprising:
- (a) providing drive currents to the coils of a stator of said linear motor;
- (b) receiving signals from first and second magnetic field detectors;
- (c) synthesising a correction signal for correcting the output of said first magnetic field detector;
- (d) correcting the output of said first magnetic field detector using said correction signal;
- (e) using the corrected first magnetic field detector output and the second magnetic field detector output to determine the position of the rotor with respect to the stator.

According to this method, the correction signal is synthesised during the use of the linear motor. As described above, it can be synthesised from the output signal of one of the magnetic field detectors or using electronic circuits/software. As is also described above, the correction signal is preferably synthesised by scaling the output of one of the magnetic field detectors at any point in time and adding it to the output of the other magnetic field detector so as to obtain a corrected output for that magnetic field detector. The scaling amount is determined at the time of manufacture and is determined in the above mentioned method by the value of a resistor in the correction circuit.

The invention will now be further described, by way of non-limitative example only, with reference to the accompanying schematic drawings, in which:—

FIG. 1 depicts a first Hall effect sensor A and a second Hall effect sensor B, the sensing probe 3 of the Hall effect sensors and mounting recesses 2 in the stator of the linear motor;

Figure 2:
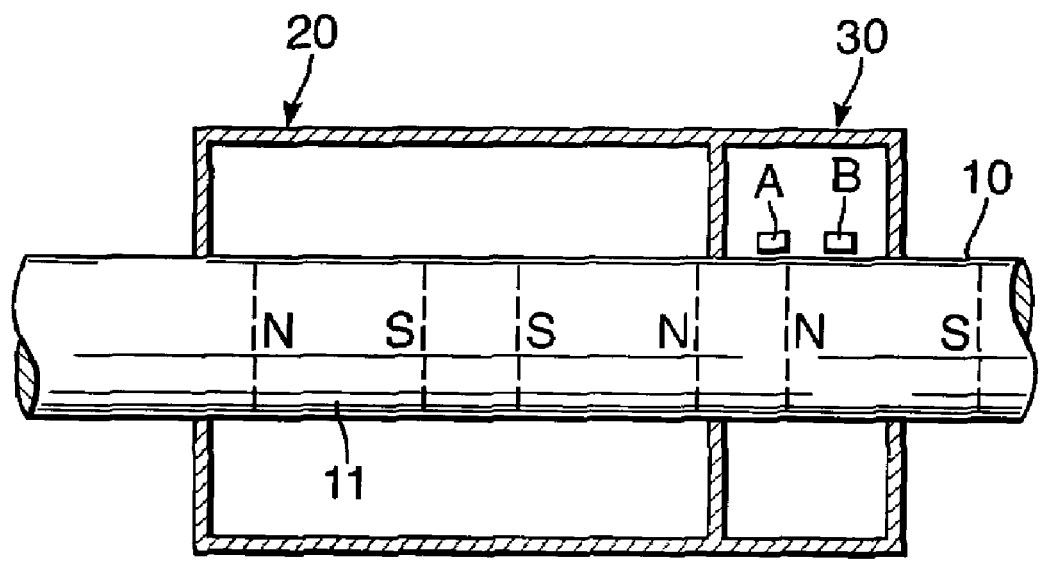
FIG. 2 shows a linear motor according to the present invention.

Referring to FIG. 2, the magnetic rotor of a tubular linear motor is depicted at 10. It will be seen that this houses a series of permanent magnets 11, spaced one from the other, and alternating in magnetic polarity. For the purpose of detecting the position of the stator, as well as for commutating stator coils of the linear motor (not shown), a set of two Hall effect sensors, A, B are located circumferentially aligned and longitudinally offset on the stator. Each of these produces a signal, according to the strength of the magnetic field emanating radially from the rotor. By the careful selection of the radial spacing of the sensors from the surface of the rotor, as well as the internal design of the magnets and spacers within the rotor, the detected fields vary substantially sinusoidally as the rotor passes the pair of detectors.

Figure 3:
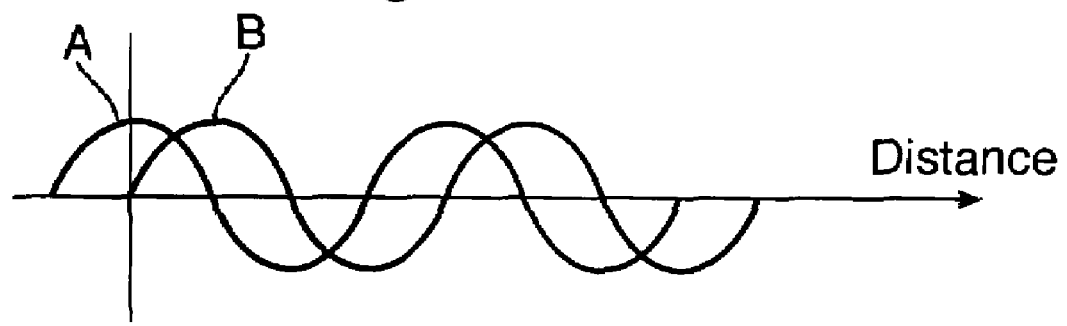
FIG. 3 shows ideal signals obtained from the Hall effect sensors of the linear motor of FIG. 2.

FIG. 3 shows the signals obtained from the first and second Hall effect sensors A, B as the rotor moves at a constant speed relative to the stator. Due to the longitudinal spacing of the Hall effect sensors it can be seen that the signals are identical in shape (sinusoidal) but off-set from one another in phase by 90°. FIG. 3, however, represents the ideal case in which the Hall effect sensors A, B can be precisely and exactly longitudinally spaced by the correct amount. However, as described above in relation to FIG. 1, the probe head 3 of the Hall effect sensors can be located at an uncertain position within the housing 1 of the sensor. This can lead to the phase shift between the sensors being up to a few degrees either side of the desired 90°.

Figure 4:
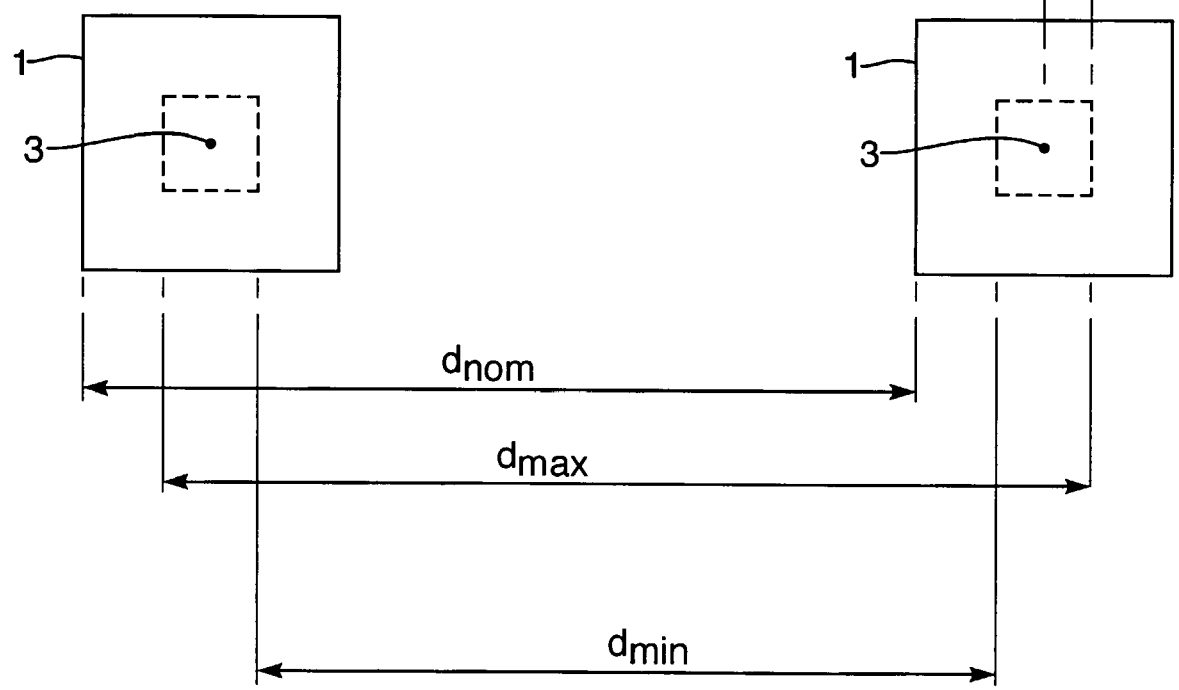
FIG. 4 shows a close up view of two Hall effect sensors separated longitudinally on the stator of a linear motor according to the present invention.

FIG. 4 illustrates the problem. The probe head 3 of the Hall effect sensors is located at a nominal point within the housing 1 with a certainty defined by the tolerance T. Thus, when the housings 1 are mounted with a longitudinal spacing $d_{nom}$ the actual spacing of the probe head can vary in the range of from $d_{min}$ to $d_{max}$, wherein:

$$d_{min} = d_{nom} - 2T$$

$$d_{max} = d_{nom} + 2T$$

Thus, even when the magnetic field detectors are mounted with a nominal predetermined distance $d_{nom}$ between them, manufacturing and/or assembly tolerances can introduce an error that causes the magnetic field detectors to be in reality mutually separated by an actual distance that is different to the nominal predetermined distance. As shown in FIG. 4, this distance can arrange from $d_{min}$ to $d_{max}$, the difference between $d_{min}$ and $d_{max}$ being 4T.

In the prior art, the nominal predetermined distance $d_{nom}$ was always set so as to be the same as the ideal working distance needed in order to obtain ideal signals. For the example of FIG. 2, ideal signals are signals that have a mutual phase offset of 90°. The ideal working distance in such a case is thus one quarter of a full cyclical pole pitch of the magnet of the rotor 10. The reason that the nominal predetermined distance was set to be the same as the ideal working distance was that this minimised the possible error in separation to 2T in either direction.

In accordance with the present invention and as will be described in more detail later, the nominal predetermined distance $d_{nom}$ is set to be different to the ideal working distance, preferably greater than the ideal working distance.

Figure 5:
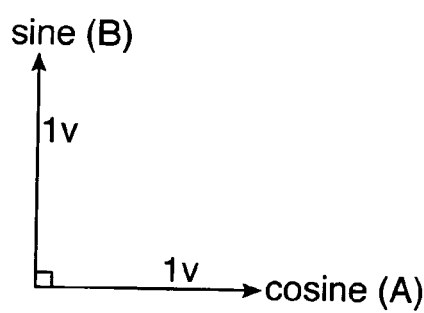
FIG. 5 is a vector diagram showing the ideal phase shift relationship between the output signals of two of the Hall effect sensors used in the linear motor of the present invention.
Figure 6:
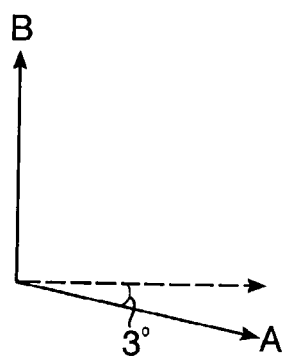
FIG. 6 is a vector diagram of a phase shift that is obtained due to manufacturing/assembly tolerances.

The Hall effect sensor signals in the ideal case are 90° out of phase. This is illustrated by the vector diagram of FIG. 5. When the longitudinal spacing between the sensors A, B is exactly correct, cosine and sine waves will be obtained as output signals, as shown in FIG. 3. When there is an error in the longitudinal spacing such that the sensing part of the Hall effect sensors A, B are spaced apart too much, then one signal will be out of phase with the other by an amount greater than 90°. This is illustrated in FIG. 6 for the example when the sensors are spaced apart such that the phase difference is 93°. This error in phase difference can cause an error in determining the position of the rotor relative to the stator.

Figure 7:
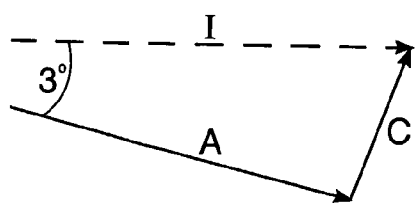
FIG. 7 is a close up of part of the vector diagram of FIG. 6 showing a correction signal according to the present invention.
Figure 8:
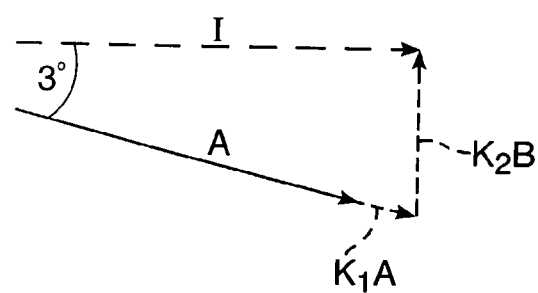
FIG. 8 is a view similar to FIG. 7, with the correction signal C being broken down into vector components.

The present invention proposes to solve this problem by adding a correction signal to the output signal of the first Hall effect sensor A so as to obtain a corrected version of the Hall effect sensor signal that is 90° out of phase with the signal from the second Hall effect sensor B. FIG. 7 shows a close-up of part of FIG. 6 showing the actually obtained signal from the first Hall effect sensor A, the ideal signal I that would be obtained if the Hall effect sensors were correctly separated and the correction signal C that is needed to transform the obtained signal into the ideal signal. FIG. 8 shows a view similar to FIG. 7, except that the correction signal C has been broken down into two vector components. These are a first vector component $K_1 A$ having the same phase as the signal from the first Hall effect sensor A and a second vector component signal $K_2 B$ having the same phase as the output of the second Hall effect sensor B. It can therefore be seen that the correction signal C can be broken down into a vector addition of a small amount of the signal from the first sensor A plus a larger amount of signal from the second sensor B.

For the example shown in FIG. 8 where signal A is shifted by 3° from the ideal, the values of $K_1$ and $K_2$ are:

$$K_1 = \frac{1}{\cos 3°} - 1 = 0.00137$$

$$K_2 = \tan 3° = 0.05241$$

The following table lists the values of $K_1$ and $K_2$ for various possible phase shifts that occur as a result of the sensors being too widely spaced apart.

| PHASE SHIFT | $K_1$ | $K_2$ | $K_2 \div K_1$ |
| --- | --- | --- | --- |
| 90° | 0 | 0 | 1 |
| 91° | 0.00015 | 0.0175 | 117 |
| 92.5° | 0.0009 | 0.0437 | 49 |
| 95° | 0.0038 | 0.0875 | 23 |
| 97.5° | 0.0086 | 0.132 | 15 |
| 100° | 0.015 | 0.176 | 12 |

It can therefore be seen that for small variations of phase shift greater than 90°, the value of $K_2$ is always much larger than the value of $K_1$. It is therefore a reasonable approximation to approximate the correction signal C as equaling the vector amount $K_2 B$ (i.e. ignoring the vector amount $K_1 A$). It can therefore be seen that the signal from the first Hall effect sensor A can be corrected by adding a scaled version of the signal from the second Hall effect sensor B.

Figure 9:
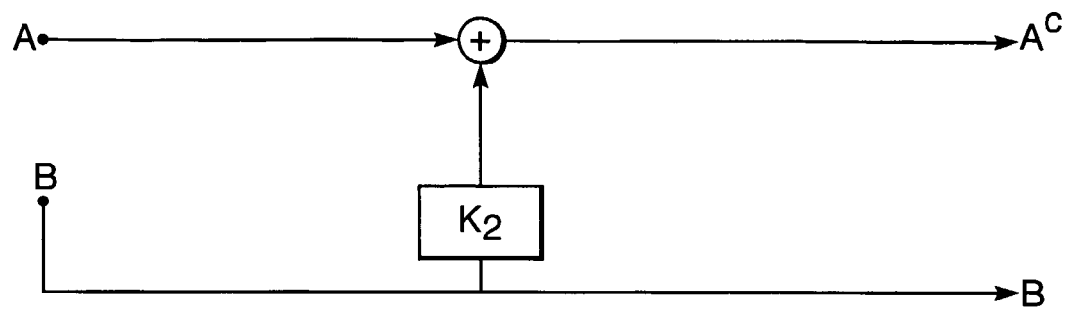
FIG. 9 shows a block diagram showing how the signal from the first Hall effect sensor A is corrected.

FIG. 9 shows a schematic block diagram of a suitable correction means. As can be seen, the signal from the second Hall effect sensor B is read out directly and the signal from the first Hall effect sensor A has a scaled version of the signal from the second Hall effect sensor B added to it so as to obtain corrected signal $A^C$. The scaling amount is determined to be $K_2$ as has been discussed earlier. The value for $K_2$ can be made to be equal to the tangent of the phase offset error. Alternatively, $K_2$ can be made to be equal to the sine of the phase offset error. Another alternative is to use a linear approximation wherein $K_2$ is made equal to the amount of phase offset error (in radians).

Figure 10:
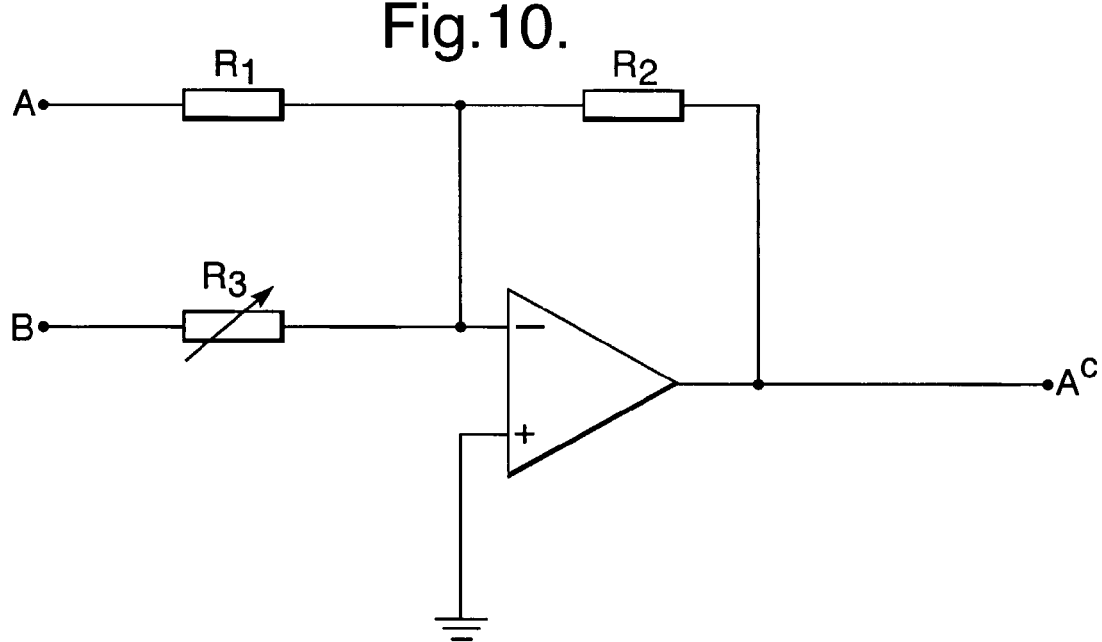
FIG. 10 shows a circuit diagram of a correction means according to the present invention.

FIG. 10 shows a practical embodiment of a circuit that can be used to obtain the signal $A^C$. As will be appreciated, the circuit adds a certain amount of signal B to signal A, the exact amount added being determined by the value of variable resistor $R_3$. The value of resistor $R_3$ can be determined during manufacture/calibration of the linear motor. The following manufacturing procedure then becomes possible:

1. Assemble Hall effect sensors with a nominal separation of the nominal predetermined distance.
2. Examine the signals from the Hall effect sensors to determine the actual distance between the probe heads 3.
3. Determine the value of resistor $R_3$ corresponding to the correct scaling amount $K_2$ so as to correct the signal from the first Hall effect sensor to be closer to 90° out of phase with the signal from the second Hall effect sensor B.

This method can be carried out in several ways. One simple possibility is to use a permanent non-variable resistor $R_3$ but to select this resistor at the time of calibration in accordance with the measured phase offset between the Hall effect sensor signals. This method has a disadvantage that each linear motor will require a different value resistor $R_3$ in accordance with the particular positions of the probe heads 3 in the Hall effect sensors. Another possibility is to use a variable resistor $R_3$ and to manually adjust the value of this resistance in accordance with the phase offset signal. This is more attractive from a manufacturing point of view because the same circuit shown in FIG. 10 can be used for every manufactured linear motor and a simple manual correction can be used to calibrate the motor. As a further alternative, the calibration procedure can be made more automated by utilising a digitally controllable variable potentiometer as resistor $R_3$. In this embodiment, a calibration computer can be used to control the value of resistance $R_3$ in accordance with signals measured at the output of the linear motor. This makes it possible to connect a calibration computer to the linear motor and for the computer to automatically calibrate the linear motor to ensure the proper correction is applied.

Once the motor has been manufactured and calibrated, the correction circuit (which is preferably built into the structure of the linear motor) ensures that the signals obtained from the two Hall effect sensors have the proper phase offset relationship.

Figure 11:
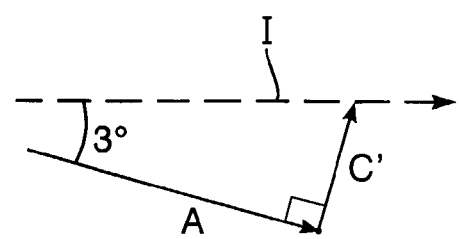
FIG. 11 is a vector diagram showing an alternative correction vector that can be used to correct the signal from the first Hall effect sensor A.
Figure 12:
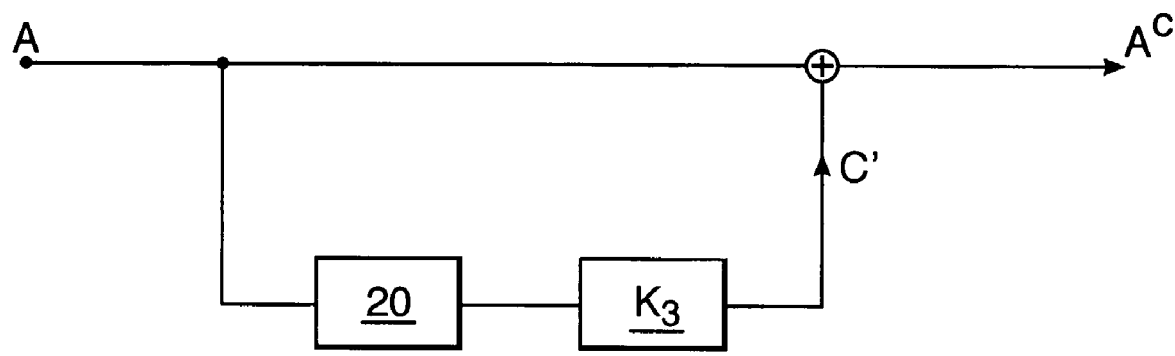
FIG. 12 is a block diagram of the correction means that can be used to achieve the correction shown in FIG. 11.

In the above embodiment, the vector amount $K_1A$ shown in FIG. 8 is ignored. However, if more accuracy is required, a further summing circuit that adds the amount $K_{1A}$ to the signal A can be utilised. Similarly, the output signal A from the first Hall effect sensor can be corrected by a phase shifted version of itself. This is illustrated in the vector diagram of FIG. 11, which is similar to the vector diagram of FIGS. 7 and 8. In FIG. 8, the correction signal C is broken down into two vector components having the same phases as the signals A and B respectively. In FIG. 11, the correction signal C is approximated by the correction signal C' with C' having a phase exactly 90° offset from the phase of the correction signal A. The correction signal C' can be synthesised by phase shifting and scaling the output from the first Hall effect sensor A. Thus, the corrected first Hall effect sensor output AC can be obtained from the vector sum A+C', where $C'=K_3A^{90}$, where $A^{90}$ denotes the signal from the first Hall effect sensor phase shifted by 90°. A block diagram for a circuit to carry out this procedure is shown in FIG. 12. As can be seen, the signal from the Hall effect sensor A is phase shifted in a phase shifter 20 and scaled by an amount $K_3$ before being added to the original signal A in order to obtain corrected signal $A^C$.

As a further alternative, the correction signal C shown in FIG. 7 can be synthesised electronically. Either analogue or digital electronics can be used.

Figure 13:
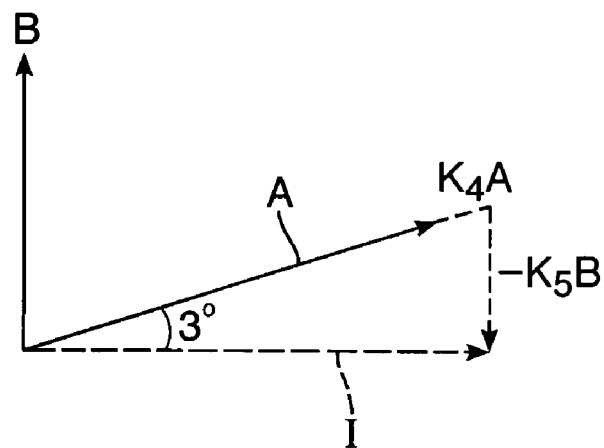
FIG. 13 is a vector diagram for the case when the Hall effect sensors are mounted too close together.

As mentioned above, the nominal predetermined distance can be made less than the ideal working distance so that the phase offset error is always negative (i.e. the phase difference between the two signals is always less than 90° in the preferred embodiment). In this case, the correction signal can be obtained by subtracting a scaled version of one signal away from the other signal, as shown in FIG. 13. Here, the ideal signal I is obtained by adding a small vector amount $K_4A$ having the same phase as signal A and by subtracting a larger amount $K_5B$ from the signal. In this case, a subtraction circuit is required. As before, the small amount of $K_4A$ can often be ignored in practice.

Although it is preferred to have only a single addition circuit or a single subtraction circuit (to minimise complexity and reduce costs), the present invention encompasses the possibility of having both an addition and a subtraction circuit so as to correct for all types of phase offset errors. In this case, the nominal predetermined distance may be made to be the same as the ideal working distance. This possibility is useful for retro-correcting existing linear motors.

During the calibration procedure, it is necessary to estimate or measure the error created by inaccurate positioning of the probe heads 3. This can be achieved in several ways. A first way is simply to use the linear motor and analyse the signals from the Hall effect sensors A and B so as to determine the phase relationship between the signals. This can be achieved by digitising the signals and using software to determine the phase relationship.

A second simple method is to perform the following steps:
(i) determine a rotor position for which the signal from said second Hall effect sensor is substantially zero; then
(ii) move the rotor relative to the stator by an amount substantially equal to one quarter of the full cyclical pole pitch of the magnets of the rotor, and
(iii) measure the signal from said first Hall effect sensor.

In the preferred embodiment the amount equal to one quarter of the cyclical pole pitch of the magnets of the rotor is 12.8 mm. This corresponds to a phase shift of 90°. If the method is to be used to correct signals intended to have other phase relationships (for example 180°), then the amount the rotor is moved in step (ii) can be adjusted accordingly, (e.g. to one half of the cyclical pitch of the magnet of the rotor). In general, the amount the rotor is moved in step (ii) is the exact amount that one would expect to need to move the rotor in order to obtain the same signal from the first Hall effect sensor as was obtained at the second Hall effect sensor before moving the rotor. The zero position is particularly convenient because this is the point at which the signals have the largest gradient.

Once the linear motor has been manufactured, it is ready for use and, in the case where the correction means is incorporated into the structure of the linear motor, the user should receive as outputs corrected signal $A^C$ and signal B. Thanks to the correction means described herein, these signals should have the correct phase relationship. It will be appreciated that the correction signal is synthesised in real time by the linear motor so as to ensure accurate signals. The calibration procedures described herein are used to ensure that the apparatus synthesises the correct signal in use.

Although it is preferred to use Hall effect sensors, any type of magnetic field detector may be used.

The invention claimed is:

1. A linear motor comprising:
   a first magnetic field detector and a second magnetic field detector mutually separated by an actual distance that differs from a nominal predetermined distance by a manufacturing/assembly error distance that is within a manufacturing/assembly tolerance;
   wherein both of said nominal predetermined distance and said actual distance are different from an ideal working distance,
   wherein said ideal working distance is a distance between said first and second magnetic field detectors at which said first and second magnetic field detectors produce ideal signals in response to detecting a magnetic field.

2. A linear motor according to claim 1, wherein said nominal predetermined distance is greater than said ideal working distance.

3. A linear motor according to claim 2, wherein said nominal predetermined distance is greater than said ideal working distance by an amount such that said actual distance will, for the known tolerances, be greater than said ideal working distance.

4. A linear motor according to claim 3, wherein said nominal predetermined distance is a distance corresponding to about 95° of phase shift between said first and second magnetic field detectors.

5. A linear motor according to claim 1, wherein said nominal predetermined distance is smaller than said ideal working distance by an amount such that said actual distance will, for the known tolerances, be smaller than said ideal working distance.

6. A linear motor according to claim 4, wherein said ideal working distance is a distance corresponding to 90° of phase shift between said first and second magnetic field detectors, which distance will be one quarter of the full cyclical pole pitch of magnets disposed on a rotor of the linear motor.

7. A linear motor according to claim 1, further comprising correction means arranged to synthesise a correction signal for correcting an output signal of said first magnetic field detector so that signals obtained after correction more closely correspond to the signals that would have been obtained had said first and second magnetic field detectors been correctly mutually separated by the ideal working distance.

8. A linear motor according to claim 7, wherein said correction means is incorporated into the structure of the linear motor so that the output signals presented to the user are already corrected.

9. A linear motor according to claim 8, wherein said correction means is arranged to add said correction signal to said output signal of said first magnetic field detector so as to obtain a corrected first magnetic field detector signal.

10. A linear motor according to claim 7, wherein said correction signal comprises a scaled version of the output signal of said second magnetic field detector.

11. A linear motor according to claim 10, wherein said correction means is arranged to scale the output of said second magnetic field detector by an amount dependent on the actual distance separating said first and second magnetic field detectors.

12. A linear motor according to claim 11, wherein the scaling amount is determined by a resistor in a summing circuit of said correction means.

13. A linear motor according to claim 12, wherein said resistor is an adjustable potentiometer.

14. A linear motor according to claim 13, wherein said adjustable potentiometer is digitally controllable by a calibration computer.

15. A linear motor according to claim 7, wherein said correction signal comprises a scaled and phase shifted version of the output signal of said first magnetic field detector.

16. A linear motor according to claim 15, wherein said correction signal is a scaled version of said output signal of said first magnetic field detector phase shifted by 90°.

17. A linear motor according to claim 7, wherein said correction signal is synthesised digitally.

18. A method of arranging magnetic field detectors in a linear motor, said method comprising:
   (a) determining an ideal working distance between first and second magnetic field detectors at which said first and second magnetic field detectors produce ideal signals in response to detecting a magnetic field;
   (b) selecting a nominal predetermined distance that is different from said ideal working distance; and
   (c) assembling said first and second magnetic field detectors on a stator member so as to be said nominal predetermined distance apart.

19. A method according to claim 18, wherein said nominal predetermined distance is selected to be greater than said ideal working distance.

20. A method according to claim 19, wherein said nominal predetermined distance is greater than said ideal working distance by an amount such that an actual distance between said first and second magnetic field detectors will, for the known tolerances, be greater than said ideal working distance.

21. A method according to claim 18, wherein said ideal working distance is a distance corresponding to 90° of phase shift between said first and second magnetic field detectors, which distance will be one quarter of the full cyclical pole pitch of magnets disposed on a rotor of the linear motor.

22. A method according to claim 21, wherein said nominal predetermined distance is a distance corresponding to about 95° of phase shift between said first and second magnetic field detectors.

23. A linear motor comprising:
   a first magnetic field detector and a second magnetic field detector mutually separated by an actual distance;
   wherein said actual distance differs from an ideal working distance, said ideal working distance being a distance between said first and second magnetic field detectors enabling said first and second magnetic field detectors to produce ideal signals in response to detecting a magnetic field; and
   further comprising correction means arranged to synthesise a correction signal for correcting an output signal of said first magnetic field detector so that the signals obtained after correction more closely correspond to the ideal signals that would have been produced had said first and second magnetic field detectors been mutually separated by the ideal working distance.

24. A method of configuring magnetic field detectors in making a linear motor, said method comprising:
   (a) assembling first and second magnetic field detectors on a stator member so as to be a nominal predetermined distance apart;
   (b) analysing signals from said magnetic field detectors so as to determine a correction signal; and
   (c) adjusting correction means to provide that, in use, said correction signal is synthesised and used to correct the output of said first magnetic field detector so that the signals after correction more closely correspond to ideal signals.

25. A method according to claim 24, wherein step (b) includes determining a scaling amount to be used in scaling an output of said second magnetic field detector, said scaled output being for use as said correction signal.

26. A method according to claim 25, wherein step (b) includes
    (i) determining a rotor position for which the signal from said second magnetic field detector is substantially zero;
    (ii) moving the rotor relative to the stator by an amount substantially equal to one quarter of a full cyclical pole pitch of magnets associated with the rotor, and
    (iii) measuring the signal from said first magnetic field detector.

27. A method according to claim 26, wherein said scaling amount is determined in accordance with the signal from the first magnetic field detector measured in step (iii).

28. A method according to claim 24, wherein said correction means is digitally adjusted by a computer connected to said linear motor.

29. A method according to claim 28, wherein said correction means is adjusted until it is determined that said signals after correction are substantially ideal.

30. A method according to claim 24, wherein signals from said first and second magnetic field detectors that are 90° out of phase are considered to be ideal signals.

31. A method according to claim 24, wherein said correction means is incorporated into the structure of the linear motor.

32. A method according to claim 24, wherein said nominal predetermined distance is selected to be different from an ideal working distance defined as the mutual separation of the first and second magnetic field detectors that gives ideal signals.

33. A method of operating a linear motor, said method comprising:
    (a) providing drive currents to the coils of a stator of said linear motor;
    (b) receiving signals from first and second magnetic field detectors;
    (c) synthesising a correction signal for correcting the output of said first magnetic field detector;
    (d) correcting the output of said first magnetic field detector using said correction signal;
    (e) using the corrected first magnetic field detector output and the second magnetic field detector output to determine the position of the rotor with respect to the stator.

34. A method according to claim 33, wherein said correction signal is added to the output of said first magnetic field detector in step (d).

35. A method according to claim 34, wherein said correction signal is synthesised in step (c) by scaling the output signal of said second magnetic field detector.

36. A method according to claim 35, wherein the scaling amount is determined by a resistor in a correction circuit of said linear motor.

37. A method according to claim 33, wherein said first and second magnetic field detectors are longitudinally separated on the stator of said linear motor by nominal predetermined distance different to an ideal working distance defined as the mutual separation of the first and second magnetic field detectors that gives ideal signals.

38. A method according to claim 37, wherein said ideal working distance is a distance corresponding to 90° of phase shift between said first and second magnetic field detectors.

* * * * *